UNITED STATES PATENT OFFICE.

ROBERT W. P. HORN, OF ALLENTOWN, JACOB H. NISSLEY, OF MANHEIM, AND DANIEL B. LATIMER, OF PHILADELPHIA, PENNSYLVANIA.

PROCESS OF REMOVING OR BREAKING THE SHELLS OF COCOANUTS.

1,161,811.   Specification of Letters Patent.   Patented Nov. 23, 1915.

No Drawing.   Application filed February 5, 1915.   Serial No. 6,348.

*To all whom it may concern:*

Be it known that we, ROBERT W. P. HORN, a citizen of the United States, residing at Allentown, in the county of Lehigh and State of Pennsylvania, JACOB H. NISSLEY, a citizen of the United States, residing at Manheim, in the county of Lancaster and State of Pennsylvania, and DANIEL B. LATIMER, a citizen of the United States, residing at Philadelphia, in the county of Philadelphia and State of Pennsylvania, have invented new and useful Improvements in the Process of Removing or Breaking the Shells of Cocoanuts, of which the following is a specification.

This invention relates to a process of removing the shells, or similar fibrous coverings, by a series of external hammer blows or concussions after subjecting said cocoanuts to a freezing and heated temperature alternately.

In carrying out this process, the cocoanuts are placed in a storage bin wherein the entrained air is held at 32° F. or less, until the contained moisture and shell is congealed or frozen, also accelerating the contraction of the contained meat within the cocoanut. These same cocoanuts are then thrust into another bin of which the entrained air is heated to 120° F. or more, until expansion of outer shell is indicated before subjecting the outer shell to a series of external hammer blows, or impacts, by hand or compressed air, steam or water automatic hammers in a machine.

Certain species or kinds of cocoanuts work better by subjecting them to heat before cooling of outer shell, so that the reverse alternation of cold and heat applications upon cocoanut shell does not depart from the scope of this invention.

The actual operation of this process renders the outer shell brittle and occurs in this wise: The cocoanut shells are subjected to a freezing temperature, slightly contract, while the inner meat remains normally the same. If the same cocoanut is placed in a heat bath or storage bin, the outer shell expands rapidly, causing numerous cracks or fissures to occur therein. At this juncture of the process, the outer shell of the nut is subjected to the action of the automatic hammer blows, concussions or pressure, at a high rate of separate articulations per minute, thereby supplementing the expansion of the outer shell of the cocoanut induced by heat. The cocoanut may be cooled or heated by any known way, as far as this process is concerned. For example; the cooling may be accomplished by the ammonia method in suitable storage bins, while the heating of the cocoanuts may be performed by the live steam or vacuum method of heating the storage bins. While only one specific method for carrying out this process has been outlined, it will be understood that certain details of the process may be varied within the scope of the appended claims.

We claim as our invention:—

1. The process of removing the shell of a cocoanut, which consists in subjecting the nut to a low temperature until the shell is slightly contracted, then subjecting the nut to a comparatively high temperature to cause rapid expansion, whereby cracks in the shell are produced, and finally, subjecting the nut to a series of hammer blows to complete the breaking of the shell.

2. The process of removing the shell of a cocoanut, which consists in subjecting the nut to a freezing temperature until contraction occurs, then exposing the nut to a comparatively high temperature and finally subjecting the nut to the blows of a hammer.

3. The process of breaking the shell of a cocoanut, which consists in subjecting the nut to a temperature of, approximately, 32° F., then subjecting the nut to a temperature of approximately 120° F. and immediately thereafter subjecting the nut to a rapid succession of blows of a hammer.

4. The process of breaking the shell of a cocoanut which consists in subjecting the nut to a certain temperature then immediately subjecting said nut to a widely varying temperature, whereby cracks are produced in the shell, and finally, subjecting the nut to a series of hammer blows to complete the breaking of the shell.

In testimony whereof, we have affixed our signatures, in the presence of four witnesses.

ROBT. W. P. HORN.
JACOB H. NISSLEY.
DANIEL B. LATIMER.

Witnesses:
I. M. DEAN,
CHARLES W. HORN,
WM. S. SHIFFER,
H. E. TROUT.